United States Patent [19]
Matsukuma et al.

[11] Patent Number: 5,905,741
[45] Date of Patent: May 18, 1999

[54] DATA ERROR CORRECTING METHOD FOR DIGITAL SIGNAL FRAMES AND APPARATUS USED IN THE METHOD

[75] Inventors: Hiroshi Matsukuma; Kunihiko Higashi, both of Kanagawa, Japan

[73] Assignee: NEC Corporation, Tokyo, Japan

[21] Appl. No.: 08/876,294

[22] Filed: Jun. 16, 1997

[30] Foreign Application Priority Data

Jun. 27, 1996 [JP] Japan ................................ 8-167669

[51] Int. Cl.$^6$ ................................................ H03M 13/00
[52] U.S. Cl. .................... 371/37.7; 371/37.3; 370/333; 370/331; 370/332; 395/525
[58] Field of Search .............................. 371/37.3, 37.7; 348/1, 6; 370/333, 331, 332; 395/525

[56] References Cited

U.S. PATENT DOCUMENTS 4,672,612  6/1987  Shishikura et al. .
5,734,853  3/1998  Hendricks et al. ..................... 395/352

FOREIGN PATENT DOCUMENTS 5-145500  6/1993  Japan .

OTHER PUBLICATIONS

M. Suka et al., "Development of DARC Decoding LSI for High–Speed FM Subcarrier System", pp. 570–577, IEEE Transactions on Consumer Electronics, vol. 40, No. 3, Aug. 1994.

Osamu Yamada et al., "Development of an Error–Correcting Method for Coded Transmission Teletext", *NHK*. 1985, pp. 38–67.

*Primary Examiner*—Reba I. Elmore
*Assistant Examiner*—McDieunal Marc
*Attorney, Agent, or Firm*—Young & Thompson

[57] ABSTRACT

Received data is applied in units of blocks to an error correcting unit and a data holding unit. If the error correcting unit normally performs error correction, the output from the error correcting unit is stored in a frame buffer. If the error correcting unit does not normally perform error correction, the data in the data holding unit is stored in the frame buffer. In this manner the first error correction processing is performed. Bit data is sequentially read out in units of bits from each block stored in the frame buffer, subjected to the second error correction processing, and returned to the frame buffer. The third error correction processing is further performed for the data sequentially output in units of blocks from the frame buffer.

12 Claims, 11 Drawing Sheets

DATA ERROR CORRECTING METHOD FOR DIGITAL SIGNAL FRAMES AND APPARATUS USED IN THE METHOD

BACKGROUND OF THE INVENTION

1. Field of the Invention

The present invention relates to a method of correcting data errors of a received digital signal in text broadcasting such as FM multiplex broadcasting and an apparatus for use in the method and, more particularly, to an error correcting method which receives one frame of a digital signal used in, e.g., the DARC (Data Radio Channel) standard, together with a parity code and performs error corrections in both the horizontal and vertical directions

2. Description of the Prior Art

Text information service has been put into practical use in FM multiplex broadcasting in which a digital signal is transmitted by using an idle spectrum region of an FM stereo signal. However, in text information using a broadcast radio wave, many pieces of error information are sometimes contained in the received digital information. Errors of this received digital information are particularly significant upon reception in mobile communication inferior in transmission quality. Therefore, it is necessary to correct errors of the received digital information on the receiving side.

Various systems have been proposed for error correction of this received digital information and the following three systems have been put into practical use as the international standard or the Japanese standard: a DRAC system and a fixed reception system primarily studied in Japan and RDS (Radio Data System) developed in Europe. These three systems are different from each other; i.e., the DARC system uses the product codes of (272,190) codes, the fixed reception system uses (272,190) codes, and the RDS uses (26,16) codes. The DARC system is considered to have a higher error correction accuracy than the other systems. The basic operation of the DARC system, i.e., error correction using the product codes of (272,190) codes will be described below.

In the DARC system, one frame of information is divided into 272 blocks and sequentially transmitted. Each block consists of 272 bits. Each of the first 190 blocks consists of a 16-bit block identification code, 176-bit data, a 14-bit CRC code, and an 82-bit first parity code. Each of the last 82 blocks consists of a 16-bit block identification code, a 190-bit second parity code, and an 82-bit third parity code. The first parity code corresponds to 190 bits of the data and the CRC code of that block, the second parity code corresponds to the data bits and the CRC codes from the first to 190th blocks, and the third parity code corresponds to the first parity codes from the first to 190th blocks.

On the receiving side, as shown in FIG. 1, a data input unit 41 sequentially supplies a signal in units of blocks of 272 bits to an error correcting unit 43. After error correction is performed by using the first and third parity codes, the signal is stored in a frame buffer 44. When the error correcting unit 43 performs error correction, an error signal 42 is output When the frame buffer 44 stores 272 blocks, the first error correction processing is complete. FIG. 2 shows the flow of this first error correction processing. Also, FIG. 3 shows an example of the result of the first error correction processing Each full circle 45 represents a bit still remaining as an error as a result of the first error correction. FIG. 3 shows that a considerable number of errors still remain.

Subsequently, vertical error correction is performed for the signal with the bit array as in FIG. 3 stored in the frame buffer 44. Corresponding bits in the 272 blocks are supplied to the error correcting unit 43, FIG. 1, where vertical error correction is performed by using the second parity code described above. The result is returned to the frame buffer 44. When this processing is sequentially repeatedly performed for the 272 bits (at least 190 bits of data bits and a CRC code), vertical error correction as the second error correction processing is complete. FIG. 4 shows the flow of this second error correction processing, and FIG. 5 shows an example of the result of the second error correction processing. Each open circle 46 represents a bit corrected by the second vertical error correction. Each full circle 47 represents a bit which still remains as an error even after the first and second error corrections. FIG. 5 indicates that as a result of the horizontal and vertical error corrections, a considerable number of error bits are corrected but a few errors still remain.

Accordingly, horizontal error correction is again performed for the signal with the bit array as in FIG. 5 stored in the frame buffer 44. 272 bits of each block are sequentially supplied to the error correcting unit 43, FIG. 1, horizontal error correction is again performed by using the first and third parity codes, and the result is returned to the frame buffer 44. When this processing is sequentially repeatedly performed for the 272 blocks, horizontal error correction again performed as the third error correction processing is complete. FIG. 6 shows the flow of this third error correction processing, and FIG. 7 shows an example of the result of the third error correction processing. Each open circle 49 represents the position of a bit whose error is finally corrected. As a result, all errors are corrected with a very high accuracy.

If, however, the received signal is inferior in quality and contains a large number of errors, error bits which are left uncorrected exist as indicated by full circles 48. If these error bits 48 remain, this frame is discarded and a frame received next is similarly error corrected and output to the screen. Alternatively, as proposed in Japanese Unexamined Patent Publication No. Hei 5-145500, a block in which error bits remain is rewritten with data of a corresponding block received thereafter and is output to the screen. Still another measure is to again receive frame information after 5 seconds or more elapse, perform horizontal error correction for blocks corresponding to blocks (BLK9, BLK11, and BLK264 in FIG. 7) containing error bits, and, if the errors are corrected, output these error-corrected blocks to the screen in place of the preceding blocks (BLK9, BLK11, BLK264 in FIG. 7) in which error bits remain.

As a result of a simulation of this system, the error correction probability when decoding is done by a variable threshold value is about 90% for errors of 11 bits and 30% for errors of 13 bits. When the signal has an 82-bit parity code for 176-bit data, errors up to 11 bits can be corrected with a high accuracy, but the error correction probability for errors more than that is extremely low. The reason for this is as follows. For a predetermined parity code, errors having the number of bits larger than a predetermined number, e.g., 11, cannot be normally corrected, i.e., they are abnormally corrected. This makes the subsequent correction processing using parity check unreliable, so even normal bit data is also rewritten. If normal bit data is thus rewritten, normal data cannot be restored in the subsequent second and third error corrections.

As described above, when a block which cannot be corrected by three error corrections in the horizontal, vertical, and horizontal directions is replaced with a subsequent signal, the processing time is undesirably prolonged.

If final error data exists in a final block, the processing time becomes almost twice the processing time when error correction processing is completed by three error corrections.

In the conventional error correcting system, in a signal containing error bits exceeding the error correcting capacity, even normal bit data is also corrected by error correction processing Since this cannot be corrected by the subsequent error correction processing, the correcting capacity is extremely degraded. Also, when this abnormally corrected signal is replaced with a subsequent signal, the time required for a series of error corrections is prolonged. This influence on, e.g., FM multiplex broadcasting is that it takes a very long time to display information or characters on the screen of a liquid crystal display or the like.

SUMMARY OF THE INVENTION

It is an object of the present invention to provide an error correcting method and an error correcting apparatus for received digital information in mobile communication, which can shorten the time required for error correction processing.

According to the present invention, there is provided a data error correcting method comprising the first error correction processing in which error correction is sequentially performed in units of blocks for signal information by which one frame information is transmitted by continuously transmitting a plurality of blocks each having digital information consisting of a plurality of continuous bits, if error correction is normally performed, the corrected block information is stored in a frame buffer, and if error correction is not normally performed, block information before error correction is stored in the frame buffer, the second error correction processing in which after this first error correction processing, error correction is sequentially performed for bit information selected in units of bits from each of the block information stored in the frame buffer, and signal information corresponding to the array of the original signal information is stored in the frame buffer, and the third error correction processing in which after this second error correction processing, error correction is sequentially performed in units of blocks for the signal information which is stored in the frame buffer and corresponds to the array of the original signal information, wherein the signal information obtained as a result of this third error correction processing is used as an output.

According to the present invention, there is also provided a data error correcting apparatus comprising a signal receiving unit for receiving signal information by which one frame information is transmitted by continuously transmitting a plurality of blocks each having digital information consisting of a plurality of continuous bits, an error correcting unit for performing error correction processing for input digital information consisting of a plurality of bits, a data holding unit for temporarily holding the digital information consisting of a plurality of bits applied to the error correcting unit, and a frame buffer for storing bit data of signal information having an array corresponding to the frame information received by the signal receiving unit or bit data of error-corrected signal information, wherein in the first error correction the signal information received by the signal receiving unit is applied in units of blocks to the error correcting unit and the data holding unit, if error correction is normally performed, an output from the error correcting unit is stored in the frame buffer, and if error correction is not normally performed, an output from the data holding unit is stored in the frame buffer, in the second error correction after this first error correction, each block stored in the frame buffer is error-corrected in units of bits by the error correcting unit and returned to the frame buffer, in the third error correction after this second error correction, the information stored in the frame buffer is error-corrected in units of blocks by the error correcting unit and returned to the frame buffer, and the result of this third error correction is used as an output.

In the present invention, if error correction is not normally performed in the first error correction processing, block data before error correction is not rewritten by error correction. Therefore, the second error correction processing following the first error correction processing is performed for data with a system closer to a normal value than the received data. Consequently, the data further approaches the normal-value data in this second error correction processing. Since the third error correction processing is performed for this data further close to the normal-value data, the result of the third error correction processing has very few error bits. Actually, error data is eliminated in the third error correction processing unless the transmission quality is extremely low.

DETAILED DESCRIPTION OF THE PREFERRED EMBODIMENT

The present invention will be described below with reference to the accompanying drawings.

Figure 1:
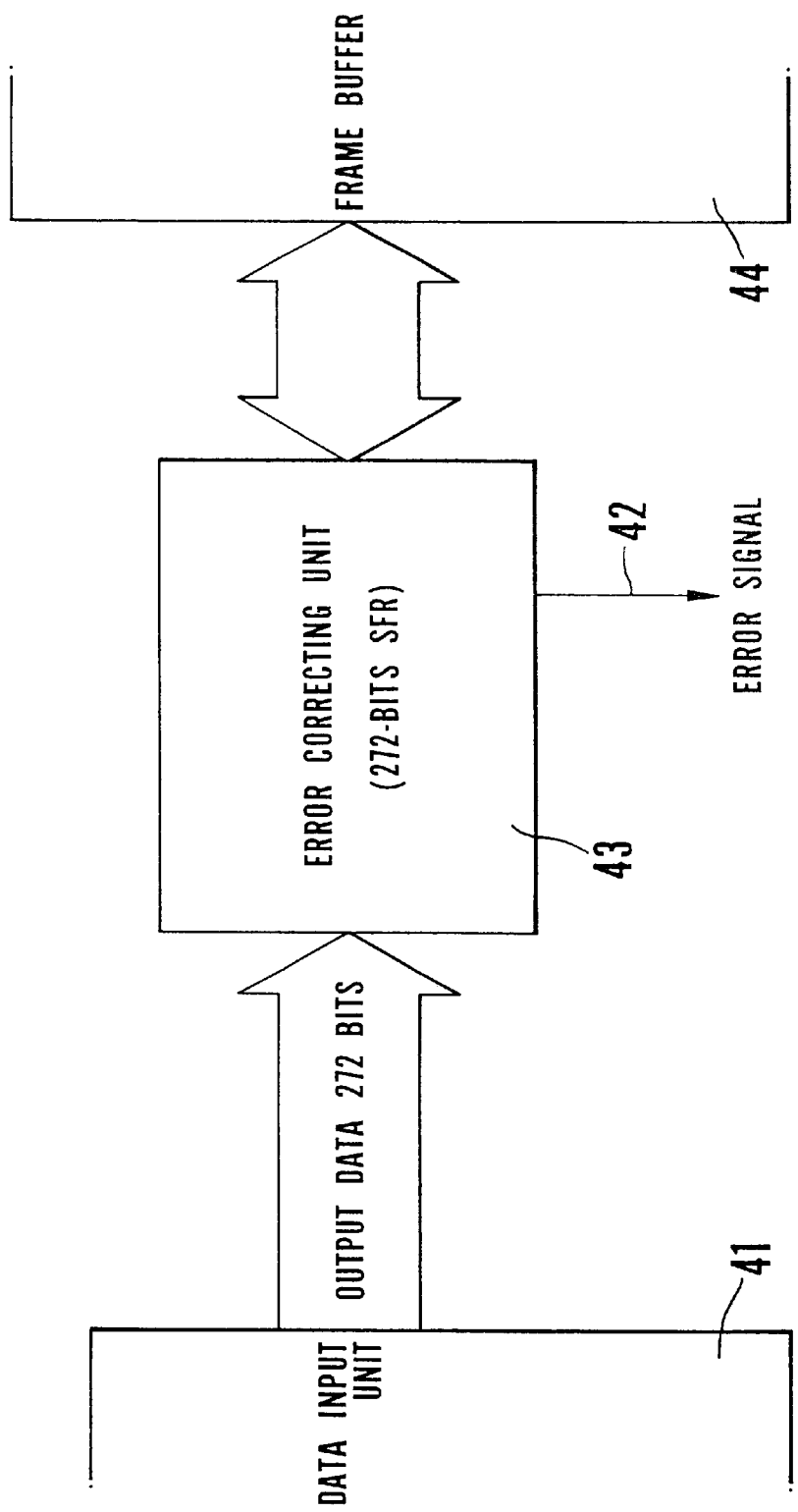
FIG. 1 is a block diagram showing a conventional data error correcting apparatus.
Figure 2:
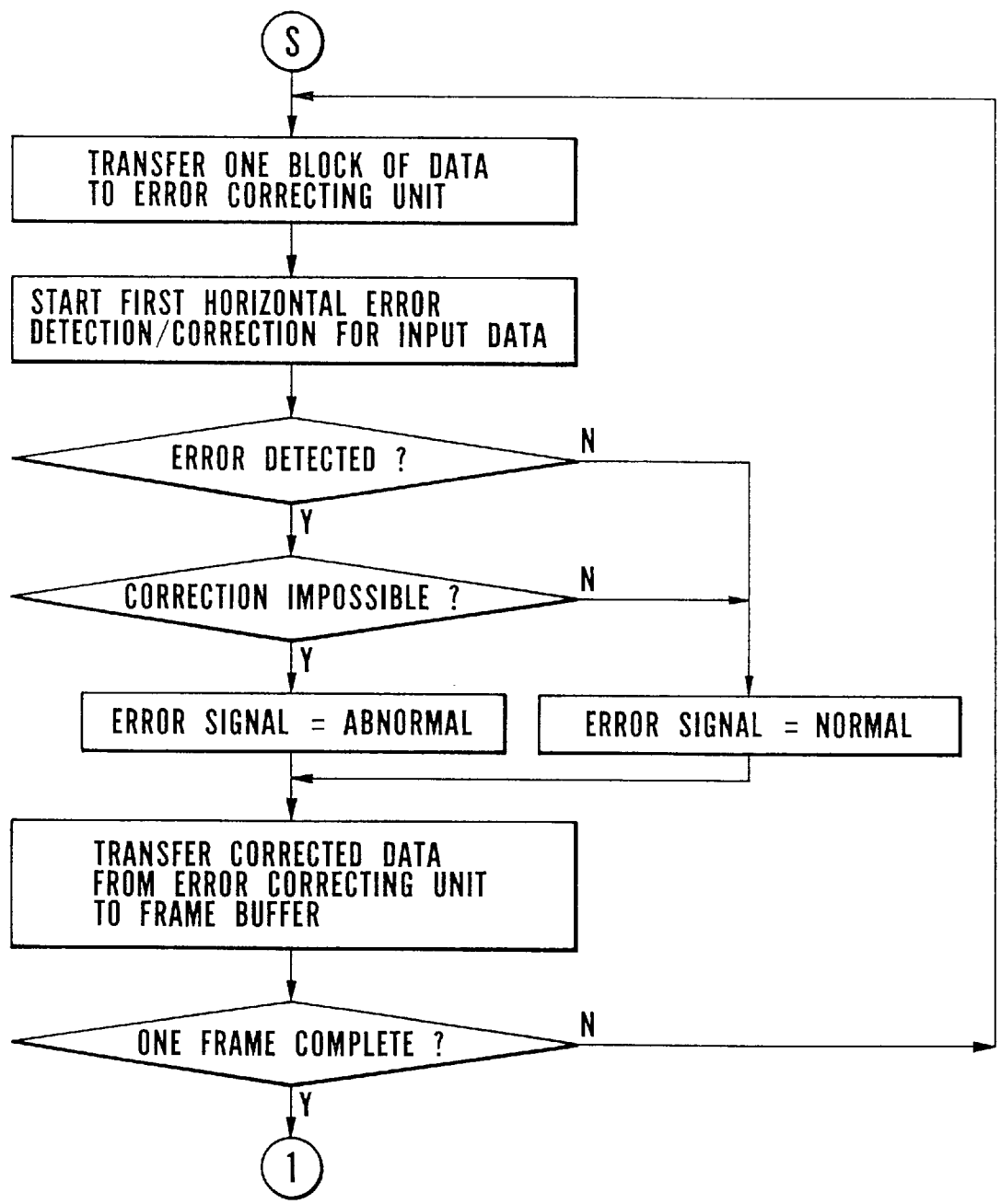
FIG. 2 is a flow chart showing the process of a first error correction in the conventional data error correcting method.
Figure 3:
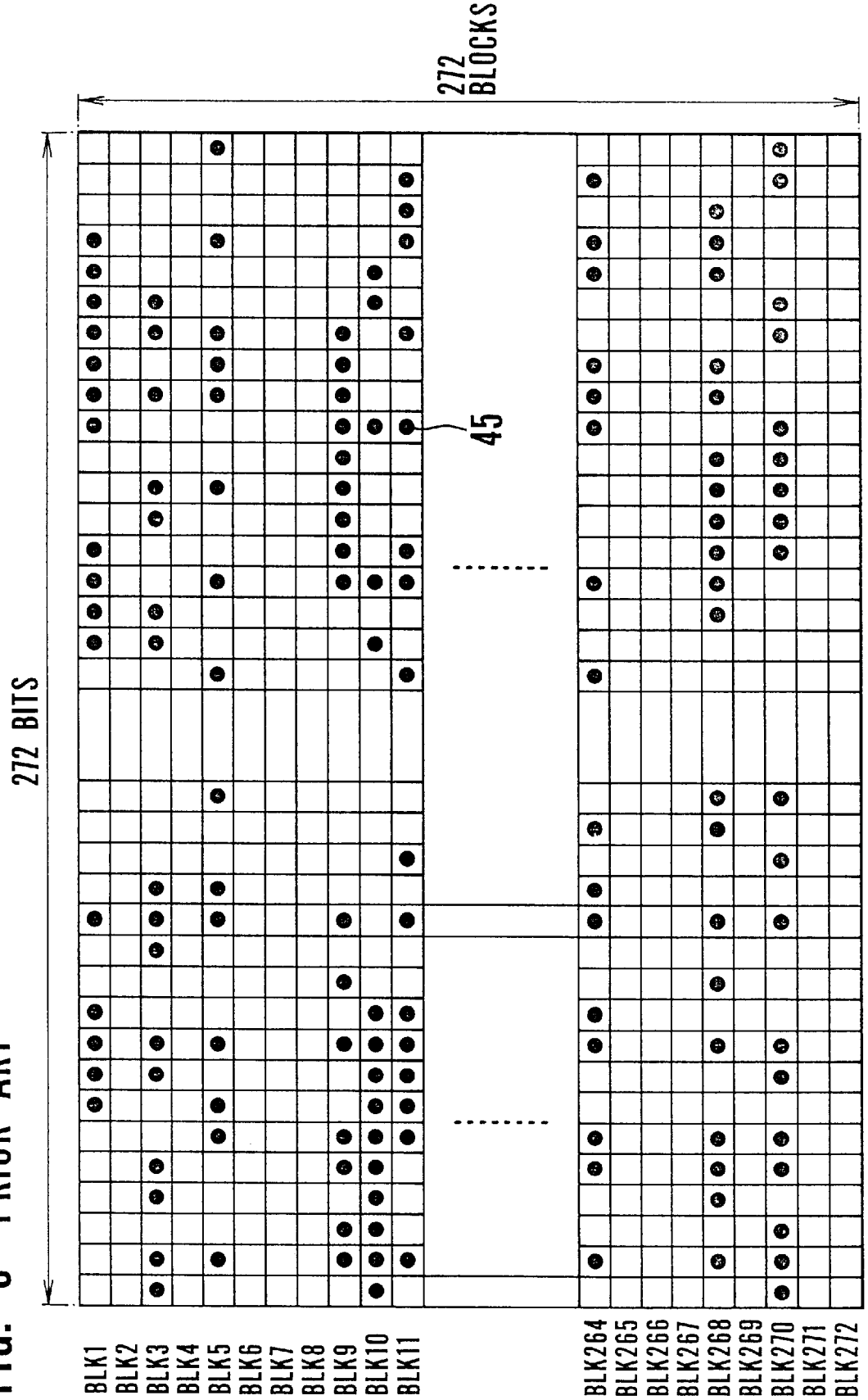
FIG. 3 is a view for explaining the state of one frame of data when the first error correction processing is completed by the conventional data error correction.
Figure 4:
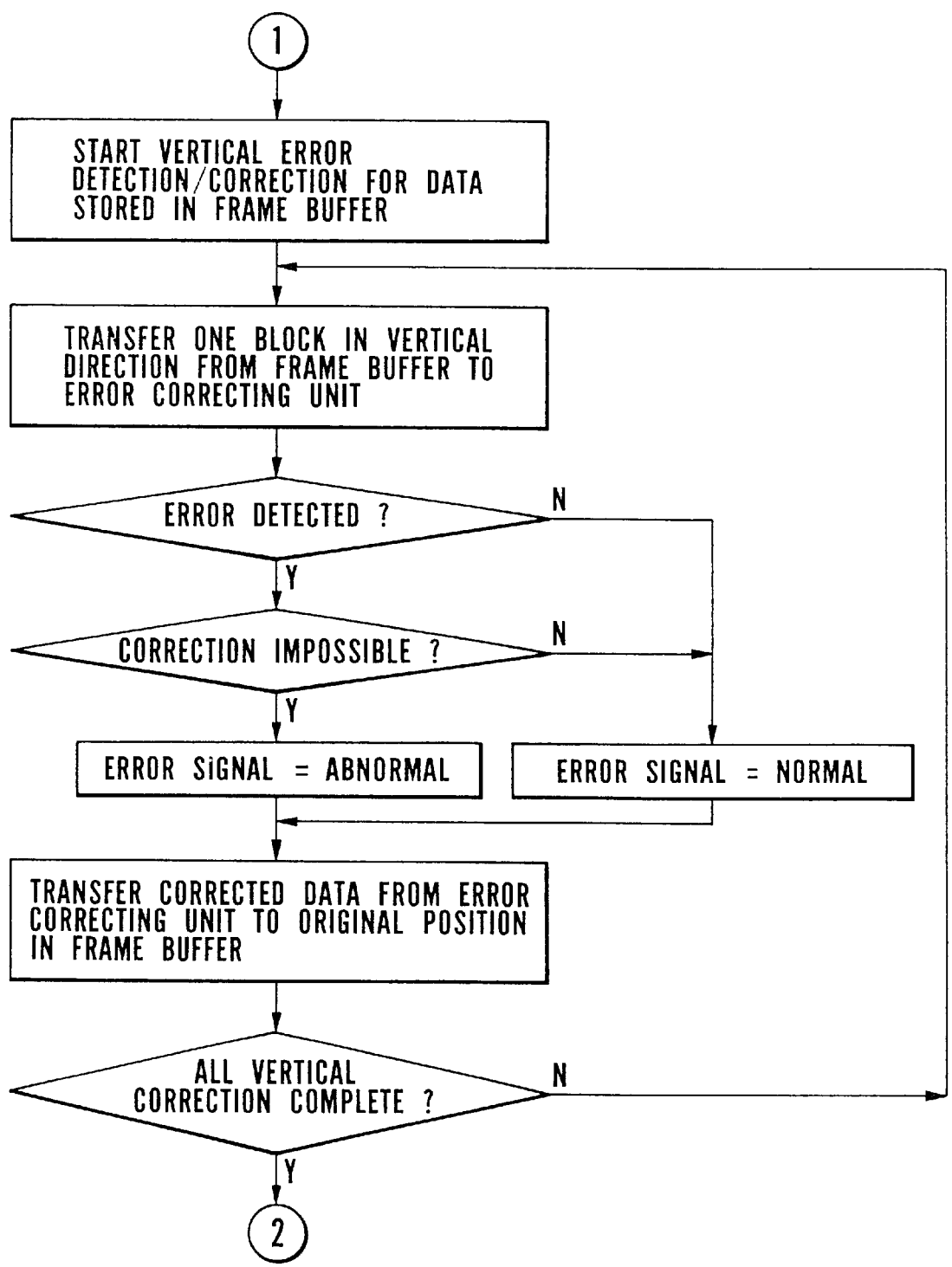
FIG. 4 is a flow chart showing the process of a second error correction in the conventional data error correcting method.
Figure 5:
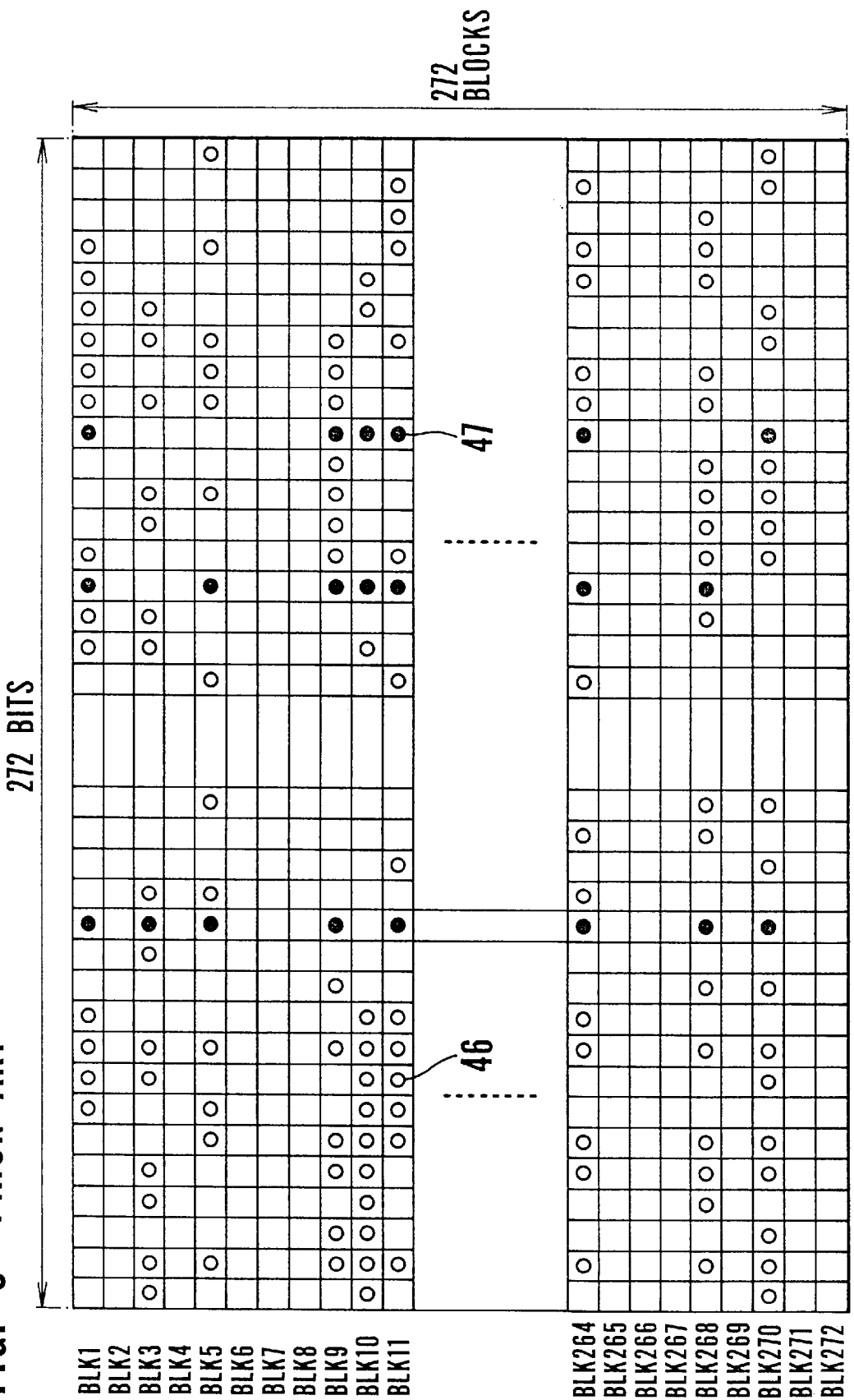
FIG. 5 is a view for explaining the state of one frame of data when the second error correction processing is completed by the conventional data error correction.
Figure 6:
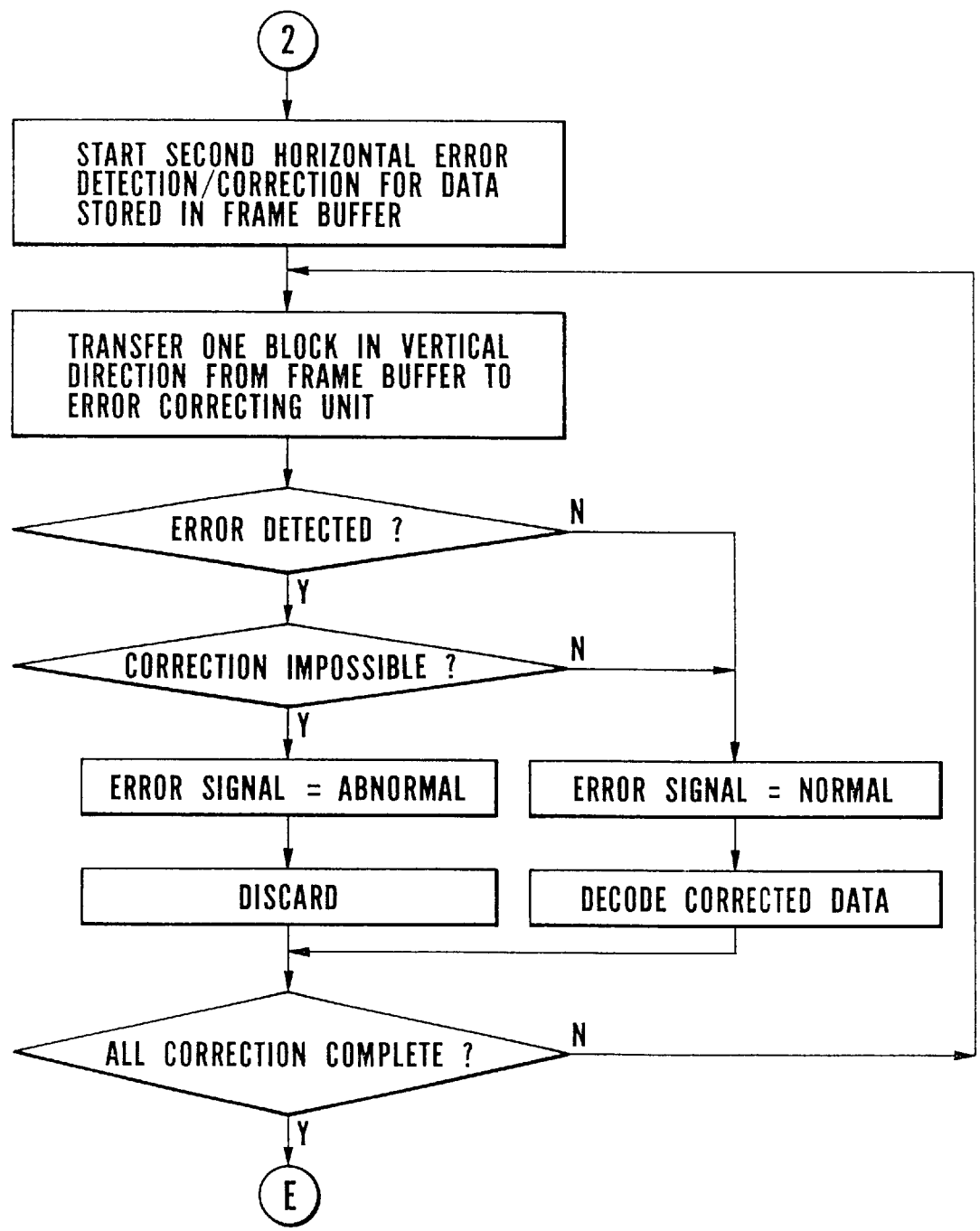
FIG. 6 is a flow chart showing the process of a third error correction in the conventional data error correcting method.
Figure 7:
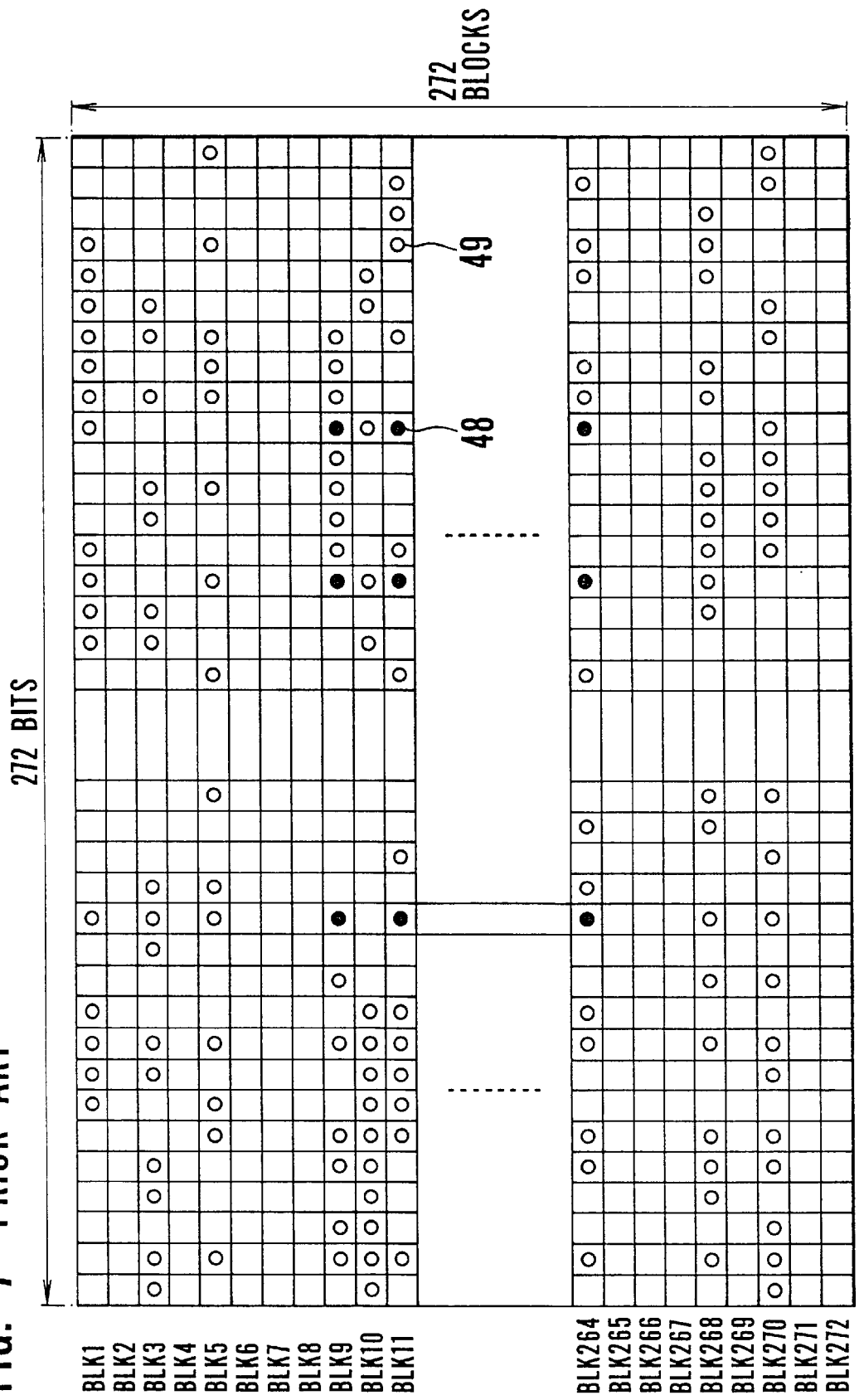
FIG. 7 is a view for explaining the state of one frame of data when the third error correction processing is completed by the conventional data error correction.
Figure 8:
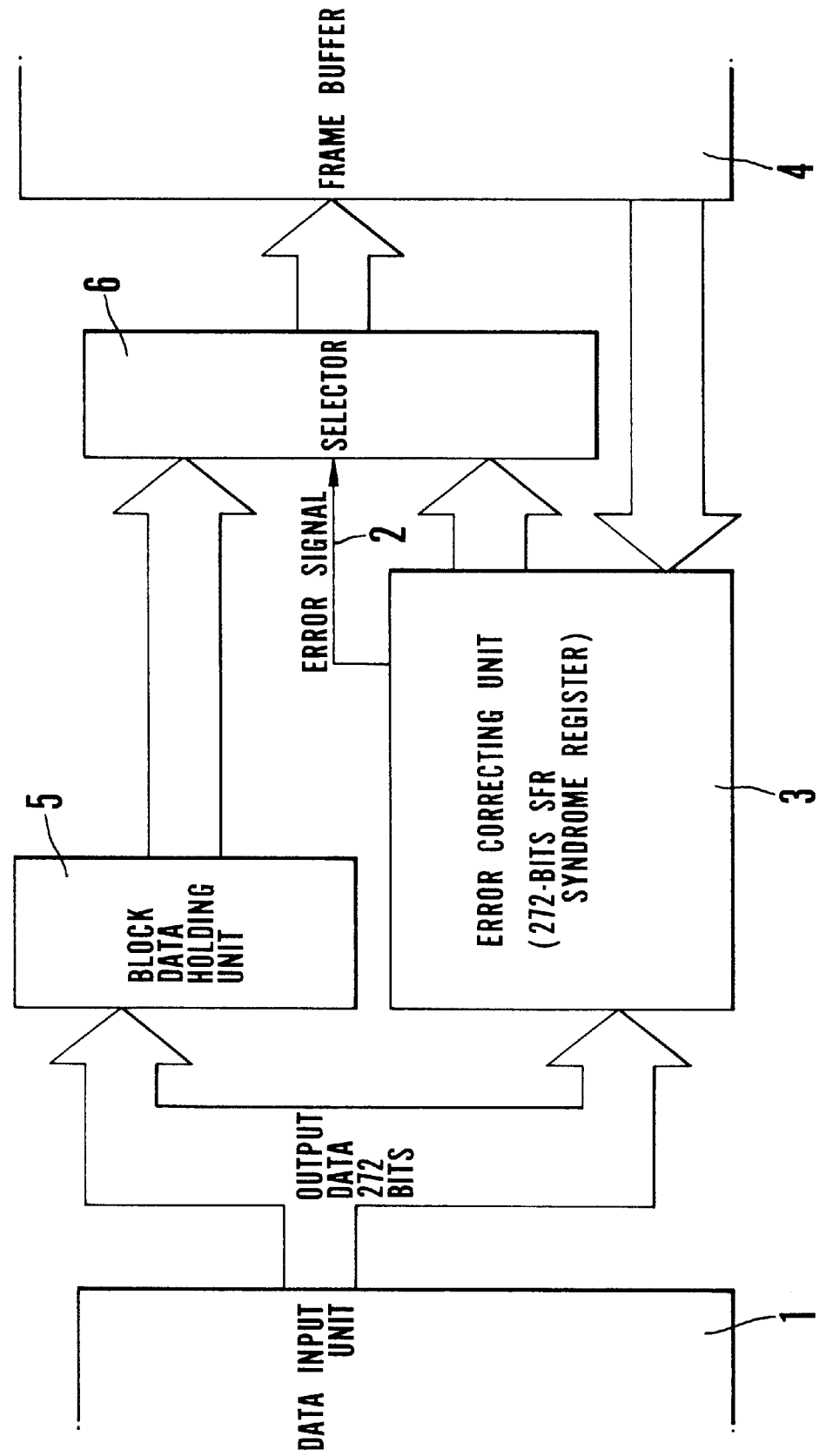
FIG. 8 is a block diagram showing a data error correcting apparatus used in one embodiment of the present invention.
Figure 9A:
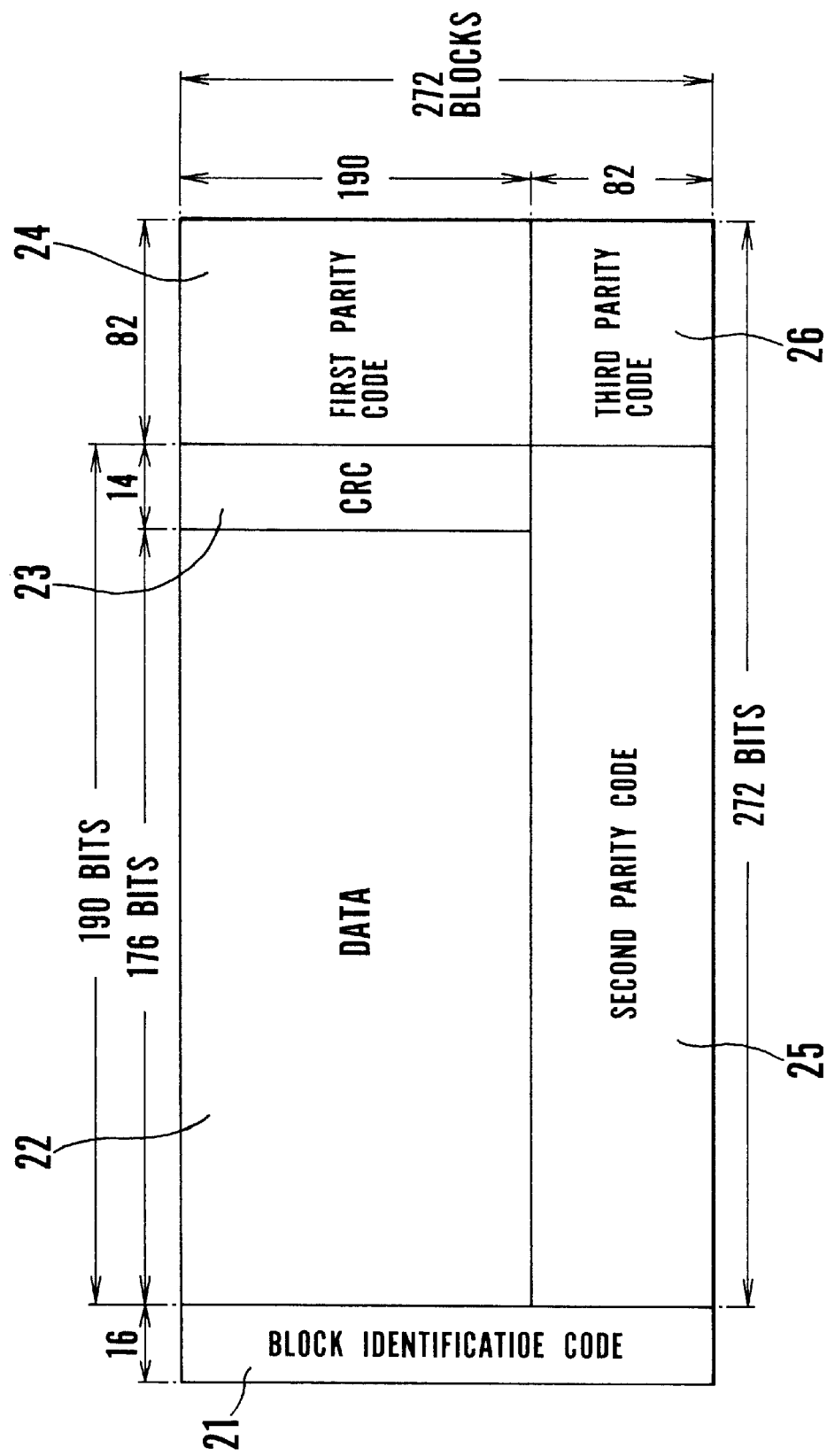
FIG. 9A is a view for explaining one frame of data of a signal to be processed in the embodiment of the present invention.
Figure 9B:
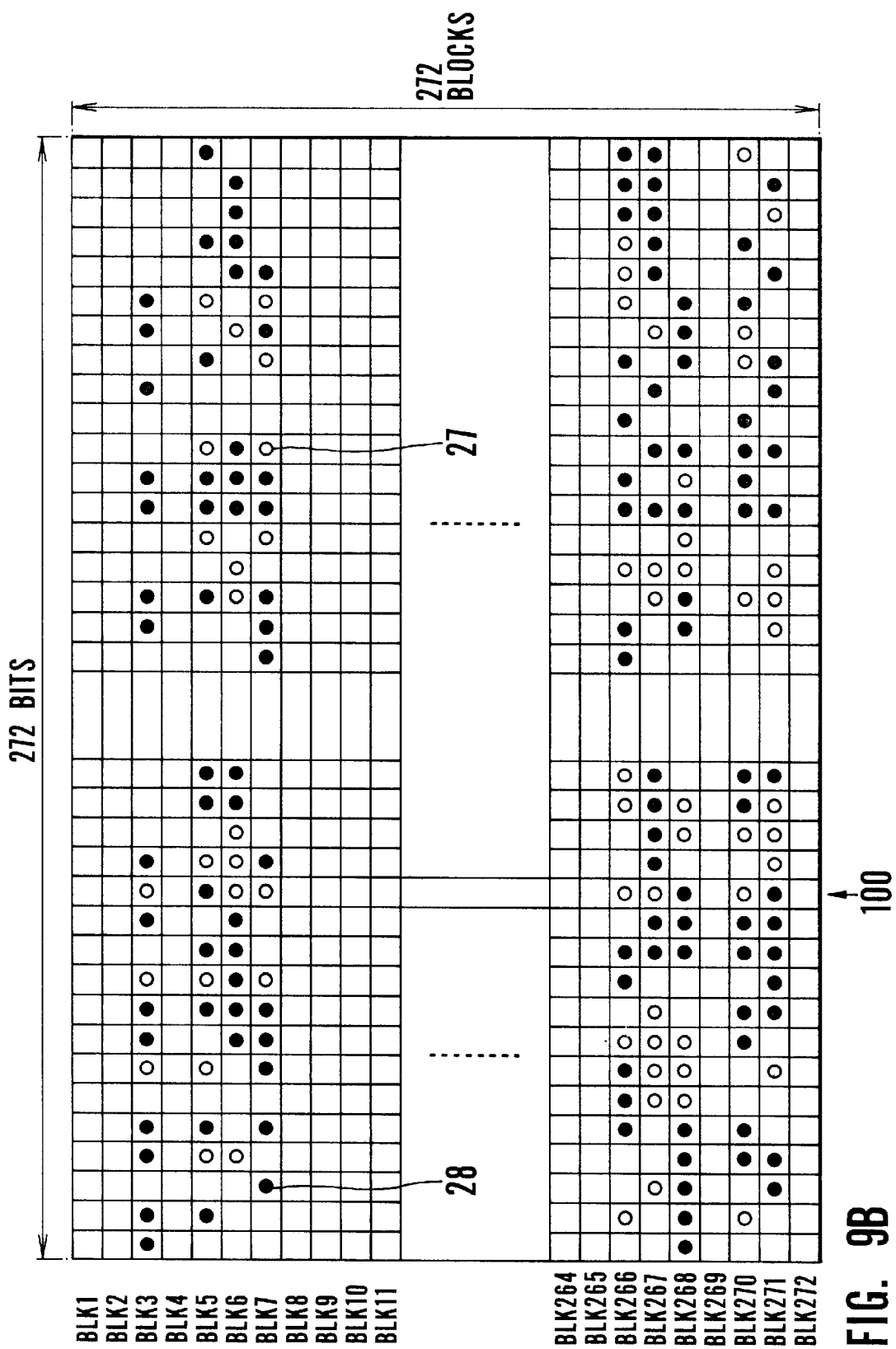
FIG. 9B is a view for explaining the state of error correction for one frame of data.
Figure 10:
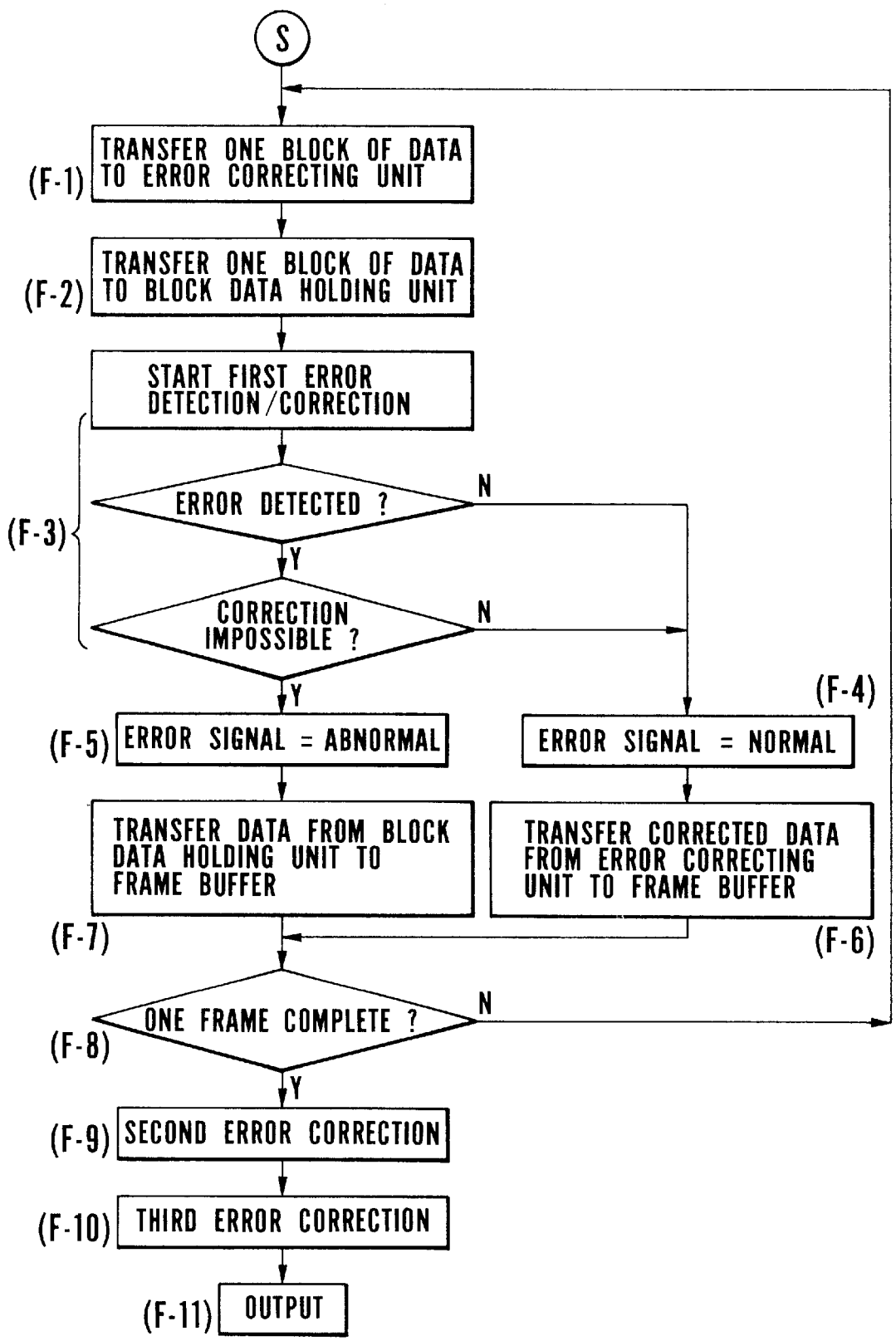
FIG. 10 is a flow chart showing the process of a data error correcting method according to the embodiment of the present invention.

FIG. 8 is a block diagram showing the major components of an error correcting apparatus according to one embodiment of the present invention. FIG. 9A schematically shows one frame of bit data in FM multiplexed text broadcasting FIG. 9B shows the way bit error correction is performed. FIG. 10 is a flow chart showing an error correcting method according to the embodiment of the present invention, particularly the method of first error correction processing as the principal part.

In multiplexed text broadcasting using idle channels of FM stereo broadcasting, as shown in FIG. 9A, one frame of text information is divided into 272 blocks and continuously transmitted. Each of the first to 190th blocks contains a 16-bit block identification code 21, 190-bit data 22 (including a 14-bit CRC code in the end portion), and an 82-bit first parity code 24. Each of the 191st to 272nd blocks contains the 16-bit block identification code 21, a 190-bit second parity code 25, and an 82-bit third parity code 26. The first parity code 24 corresponds to the data 22 and 23 of the block containing this parity code 24. The second parity code 25 forms a parity code for a combination of corresponding bits of data of the first to 190th blocks by combining corresponding bits of the 191st to 272nd blocks. The third parity code 26 corresponds to the second parity code 24 of the block containing this parity code 26.

Referring to FIGS. 8 and 10, in the first error correction processing, a received signal applied to a data input unit 1 is supplied in units of blocks of 272 bits to an error correcting unit 3 and a block data holding unit 5 (F-1 and F-2). The block data holding unit 5 temporarily holds the supplied data. The error correcting unit 3 which includes a 272-bit SFR syndrome register performs error correction processing by using the last 82 bits as a parity code (F-3). If this error correction is normally performed, a signal indicating "normal" is output as an error signal 2 (F-4). If error correction is not normally performed, a signal indicating "abnormal" is output as the error signal 2 (F-5). If the error signal 2 indicates "normal", a selector 6 sends output data (i e., error-corrected output data) from the error correcting unit 3 to a frame buffer 4 (F-6). If the error signal 2 indicates "abnormal", the selector 6 sends data from the block data holding unit 6 to the frame buffer 4.

The frame buffer 4 has a memory with arrays shown in FIGS. 9A and 9B and stores the 272 block data subjected to the first error correction in the order of reception (F-8).

In the second and subsequent error corrections, the error correcting unit 3 receives processing data from the frame buffer 4. In the second error correction processing, 272 bits consisting of corresponding bits of each block data are sequentially supplied to the error correcting unit 3 so that error correction is performed for 272 bits consisting of corresponding bits of each block data (F-9). In the third error correction processing, the data is again supplied to the error correcting unit 3 in units of blocks from the first block (F-10). After being error-corrected by the error correcting unit 3, the data is returned to the frame buffer 4 via the selector 60 The result of the third error correction processing is used as a text display output (F-11).

Compared to the conventional error correcting method, the apparatus additionally has the block data holding unit 5 and the selector 60 If error correction is not normally performed in the first error correction processing, data before error correction is output as error-corrected data from the block data holding unit 5. That is, when a signal has an 82-bit parity code for 190-bit data, error correction can be normally performed for errors of up to 11 bits. However, if 12 or more error bits exist, error correction cannot be normally performed, and even normal bits are also corrected. This consequently increases the number of error bits. If the second and third error corrections are performed in this state, no accurate error correction can be performed, and the number of error bits is increased in some instances. In the present invention, if the number of error bits larger than the number corresponding to a parity code exists, these error bits are left uncorrected. Since the second error correction is performed on the basis of comparison in the vertical direction of a frame, it is highly probable that the number of error bits is decreased to 11 or less in a block in which 12 or more error bits exist in the first error correction processing. When in this state error correction is again performed in units of blocks as the third error correction processing, error bits are nearly completely eliminated.

This state will be further described with reference to FIG. 9A. Assume that error correction is performed for one frame in the first error correction processing and as a consequence bit data as shown in FIG. 9B is stored in the frame buffer 4. In FIG. 9B, the block identification code 21 is omitted. If no error bits originally exist or error bits are normally corrected, there is no error bit, so neither open circles 27 nor full circles 28 are present. The full circles 28 are error bits left uncorrected in the first error correction processing and originally present in the received data in the present invention. Also, in FIG. 9B, for comparison with the conventional technique, error bits newly produced as a result of error correction even if 12 or more error bits exist are indicated by the open circles 27.

Assume that a 13th bit column 100 of each block (BLK1 to BLK272) contains 10 error bits 28 (full circle) upon reception and 8 error bits 27 (open circle) increased by error correction of the conventional technique. Consequently, 18 bits must be corrected by the conventional technique, and this further increases error bits. In contrast, it is only necessary to process 10 error bits in the present invention, so the processing can be well controlled by the parity code 25. The result is that the error bits in this column 100 are eliminated. Since error bits in some other columns are similarly eliminated, error bits are reduced in each block (BLK1 to BLK272). Therefore, error bits are nearly completely eliminated when error correction processing is performed in units of blocks as the third processing.

In the present invention, the error bit correction probability is increased. This obviates the need for subsequent additional processing and reduces the error correction processing time.

What we claimed is:

1. A data error correcting method for digital signal frames, comprising:

first error correction processing in which data which constitutes one frame with m blocks each consisting of n bits and which requires error correction is sequentially received in units of blocks, each received block data is supplied to a data holding unit and an error correcting unit, said error correcting unit performs error correction, if the error correction is normally performed, output error-corrected data from said error correcting unit is stored in a frame buffer, and if the error correction is not normally performed, data held in said data holding unit is stored in said frame buffer;

second error correction processing in which from the data stored in said frame buffer as a result of the first error correction processing, data in a corresponding bit position is extracted from each block, error-corrected, and returned to said frame buffer; and third error correction processing in which the data stored in said frame buffer as a result of the second error correction processing is sequentially error-corrected in units of blocks.

2. A method according to claim 1, wherein each of the blocks of the data requiring error correction contains a parity code, and predetermined ones of the blocks contain bit data which forms a parity code corresponding to a data sequence as a combination of corresponding bits in other blocks.

3. A method according to claim 2, wherein the bits of the data requiring error correction are 272 bits, the m blocks are 272 blocks, the 272 bits include an 82-bit parity code, and the 272 blocks have 82 blocks containing the bit data which forms the parity code.

4. A method according to claim 3, wherein in each of the error corrections, said error correcting unit determines that the error correction is normally performed if error data of not more than 11 bits is an object of the error correction, and determines that the error correction is not normally performed if the number of error bits is larger than 11.

5. A method according to claim 1, wherein the data requiring error correction is a text information signal in FM multiplexed text broadcasting.

6. A data error correcting apparatus for digital signal frames, comprising:

a data input unit for receiving data which constitutes one frame with m blocks each consisting of n bits and which requires error correction;

a data holding unit for receiving the data in units of blocks from said data input unit;

a frame buffer capable of storing the data constituting one frame;

an error correcting unit capable of receiving the n- or m-bit data from said data input unit or said frame buffer, performing error correction for the data, and outputting the error-corrected data and a determination signal indicating whether the error correction is normally performed; and a selector for supplying the error-corrected data to said frame buffer if the determination signal indicates that the error correction is normally performed, and supplying the data held in said data holding unit if the determination signal indicates that the error correction is not normally performed, wherein the data requiring error correction is sequentially supplied in units of blocks from said data input unit to said data holding unit and said error correcting unit, first error correction is performed for the data received in units of blocks by said error correcting unit, if the error correction is normally performed, output error-corrected data from said error correcting unit is stored in said frame buffer, if the error correction is not normally performed, data before error correction held in said data holding unit is stored in said frame buffer, after the first error correction is completely performed for the m blocks, combinations of corresponding bits are sequentially supplied from each block of the m-block data stored in said frame buffer to said error correcting unit, second error correction is performed for each of the bit combinations, the error-corrected bit combinations are returned to said frame buffer, after the second error correction is completely performed for the n bit combinations, the m-block data stored in said frame buffer is sequentially applied in units of blocks to said error correcting unit, third error correction is performed for the data in units of blocks, the error-corrected data is returned to said frame buffer, and the data subjected to the third error correction is output.

7. An apparatus according to claim 6, wherein the n bits constituting one frame contain a parity code, predetermined blocks of the m blocks contain data which constitutes a parity code for combinations of corresponding bits in other blocks by combining corresponding bits in the predetermined blocks, and said error correcting unit outputs the signal indicating whether the error correction is normally performed in accordance with whether data as an object of error correction in the first error correction contains the number of error bits not more than the number of correctable error bits which the parity code contained in the data has.

8. An apparatus according to claim 6, wherein the n bits are 272 bits, the m blocks are 272 blocks, the parity code is an 82-bit code, and the number of correctable error bits is 11.

9. An apparatus according to claim 6, wherein the data requiring error correction is text information data in FM multiplexed text broadcasting.

10. A data error correcting system comprising:

a data input unit for receiving data requiring error correction and outputting n bits as one block;

an error correcting unit for receiving data in units of blocks, performing error detection/correction processing for the input data, outputting the corrected block data if the data correction processing is possible, and outputting the uncorrected block data if the data correction processing is impossible; and a frame buffer for receiving the output block data from said error correcting unit and storing only n blocks, wherein bit data from each of the n blocks stored in said frame buffer is applied as one block to said error correcting unit and again subjected to error correction processing, the data again subjected to error correction processing is sequentially read out in units of blocks and transferred to said error correcting unit, and third error correction processing is performed for the data, further comprising:

a block data holding unit for receiving and holding data output in units of blocks from said data input unit; and a selector for selecting one of the block data held in said block data holding unit and the output error-corrected block data from said error correcting unit in accordance with an error signal, said selector outputting the block data from said block data holding unit if the error signal is present and outputting the error-corrected block data from said error correcting unit if the error signal is not present.

11. A system according to claim 10, wherein said error correcting unit generates the error signal if not less than a predetermined number of error bits exist in the n bits of the block data.

12. A system according to claim 10, wherein the bit number n is 272, the block number n is 272, and the predetermined error bit number is 11.

* * * * *